United States Patent [19]

Berranger et al.

[11] Patent Number: 4,720,945
[45] Date of Patent: Jan. 26, 1988

[54] THEATER STAGE WITH MULTIPLE SPACE EXTENSIONS

[75] Inventors: Yvon Berranger, St. Sebastien sur Loire; Jean-Maurice Bouchard, Laval; Yves Guerin, Suce sur Loire; Jean-Marc Sorin, Vallet, all of France

[73] Assignee: Euterpe, Clisson, France

[21] Appl. No.: 912,793

[22] Filed: Sep. 26, 1986

[30] Foreign Application Priority Data

Sep. 27, 1985 [FR] France .................. 85 14565

[51] Int. Cl.$^4$ ............................ E04H 3/28
[52] U.S. Cl. .......................... 52/7; 52/79.5; 52/143
[58] Field of Search ............ 52/6, 7, 79.5, 79.6, 52/143

[56] References Cited

U.S. PATENT DOCUMENTS

| 3,181,203 | 5/1965 | Wenger | 52/7 |
| 3,217,366 | 11/1965 | Wenger | 52/6 |
| 3,258,884 | 7/1966 | Wenger | 52/6 |
| 3,719,386 | 3/1973 | Puckett et al. | 296/26 |
| 4,413,855 | 11/1983 | Flanagan | 52/143 X |
| 4,571,900 | 2/1986 | Kelman | 52/7 X |

FOREIGN PATENT DOCUMENTS

| 2420504 | 6/1975 | Fed. Rep. of Germany . |
| 7014399 | 4/1972 | Netherlands . |
| 616114 | 3/1980 | Switzerland . |

*Primary Examiner*—J. Karl Bell
*Attorney, Agent, or Firm*—Frost & Jacobs

[57] ABSTRACT

Theater stage according to the invention consisting of three bodies which, in a deployed position, confer a pavilion or shell shape. The central body, built on the chassis, consists of a central floor, raised platforms, side walls and a roof. The rear body, in the form of a box is built on a high floor which slides over the central floor and the platforms. The front body consists of a lifting canopy and of several floors: a sliding low floor which may comprise a higher level and two side floors in the form of pivoting quarters which hold up the low floor and which fold back between the said low floor and the chassis.

13 Claims, 8 Drawing Figures

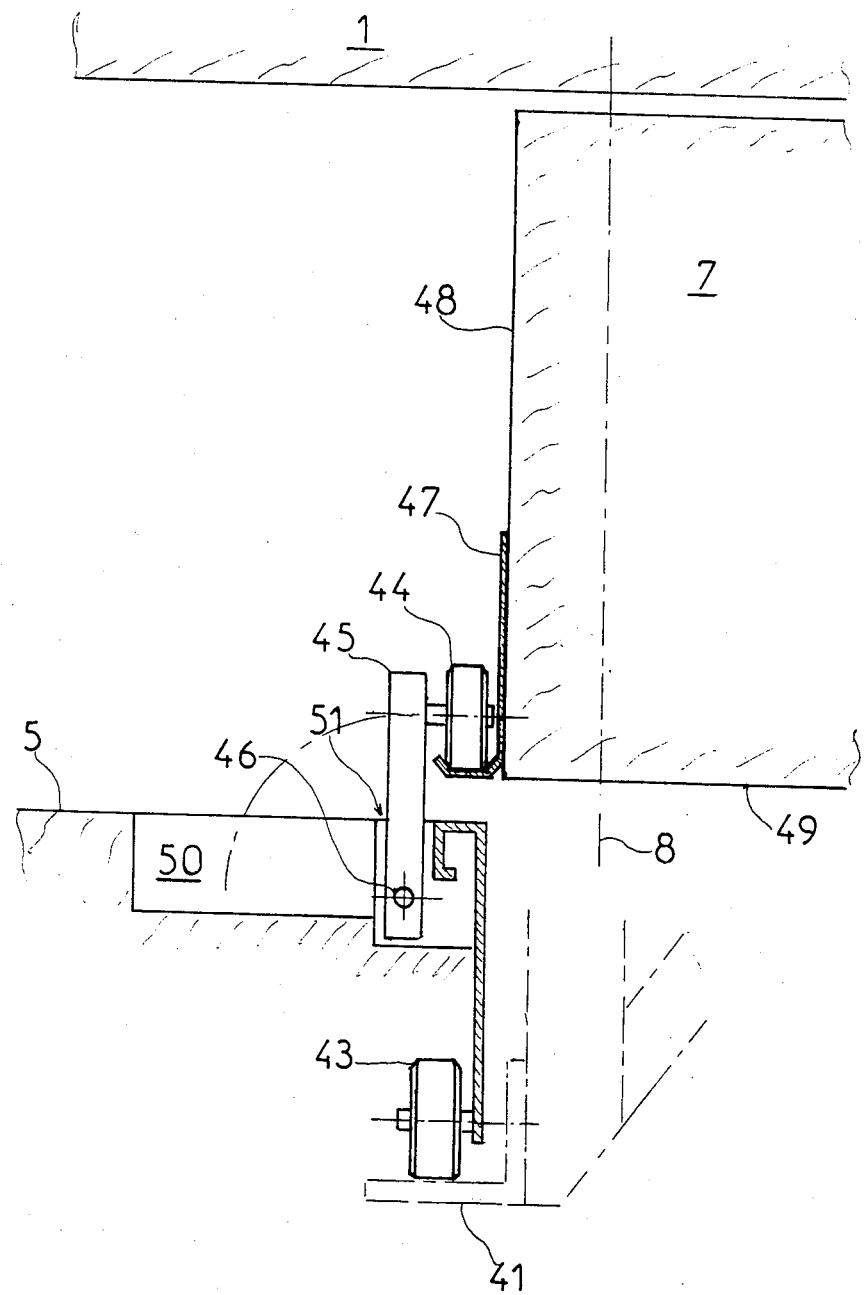
_fig.4_

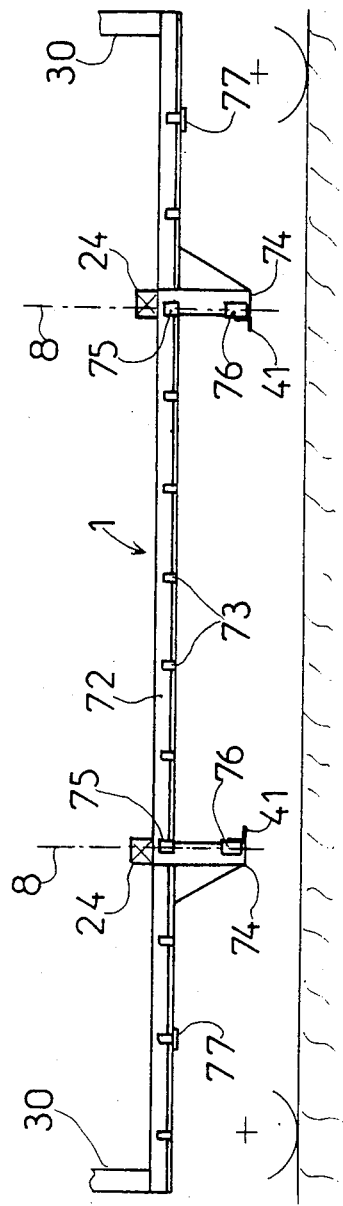

THEATER STAGE WITH MULTIPLE SPACE EXTENSIONS

The present invention relates to a theater stage with multiple space extensions and more particularly, but not exclusively, a mobile band shell.

For a long time, stages or band shells have been set up in public places such as parks and gardens and they are still being installed nowadays, though in most cases on a temporary basis, for various representations.

The temporary installation of a shell in the open air or in a hall involves, on the one hand, the disadvantage of setting up and then dismantling the stage and, on the other hand, the disadvantage of providing, in the majority of cases, only inferior acoustics, this, in general, being furthermore only of minor concern. As a general rule, these temporary installations represent a considerable cost for the organizers. The desire to develop musical culture through greater presence of orchestras or of groups is hardly compatible with currently available means.

The present invention is aimed at overcoming these disadvantages by providing a theater stage which is capable of being adapted to all kinds of needs and makes it possible to satisfy the particular conditions related to musical use and especially to the problem of acoustics.

The invention also aims to relieve the organizers of spectacles of the usual constraints of setting up and dismantling the stage.

It is known to produce mobile halls and structures whose surface area and/or volume can be varied. In documents No. CH-A-No. 616,114, U.S. Pat. No. 3,217,366 and also DE-A-No. 2,420,504, these halls or structures are arranged from a trailer which contains all the floor and/or wall elements intended to produce this increase in the basic surface area, initially limited to the framework of the trailer chassis.

The semi-trailer which can be converted into an all-purpose hall, such as is described in document No. CH-A-616,114, offers the possibility of multiplying the basic surface area of the semi-trailer at least threefold.

This increase in surface area is produced by means of a floor made of several sections which are folded accordion-fashion or are rolled onto each other. The installation of a structure of this kind is relatively long, because it requires extensive and accurate leveling of the floors which are deployed, not to mention the rigging of the mast which supports the canopy.

Document U.S. Pat. No. 3,217,366 illustrates a markedly simpler embodiment of a trailer with variable surface area; the latter can be doubled by the use of risers which are normally-stored on the floor of the trailer and then installed in front of it as required. A structure of this kind offers only a limited possibility of increasing the basic surface area.

In document DE-A-No. 2,420,504, the trailer comprises means which make it possible virtually to double the basic surface area by means of a floor which slides to the rear, supported by a structure which is anchored to the ground and to the trailer. In this case too, the possibilities of extending the basic surface area are limited, and the structure is complex, particularly so far as the roof is concerned.

The invention provides a theater stage whose basic structure is an elongate chassis resting on legs or props, and preferably on wheels; this basic structure comprises at least one side extension which is in the form of at least one mobile floor capable, furthermore, of forming a floor which is offset in relation to the central floor arranged on the chassis.

According to the invention, the theater stage comprises side extensions each side of the central floor, which consist, on the one hand, upstage and forming a lower level, of a high floor sliding over the central floor and, on the other hand, downstage and forming the lower levels, a low floor sliding under the central floor, this low floor consisting of one or more levels forming steps and it is supported, in a deployed position, by side floors.

According to another arrangement of the invention, the side floors which support the low floor during its deployment and also in a deployed position, are in the form of a quarter pivoting around a vertical shaft situated close to the corners of the central floor, on the low-floor side; these pivoting quarters are arranged between the central floor and the low floor, shutting off, in a folded position, the space between these latter floors.

According to the invention, the low floor is supported by the pivoting quarters by means of a guidance system consisting, on the pivoting quarter face directed toward the said low floor, of a guidance rail and, on the low floor, of a roller mounted on an arm which is capable of being retracted into a housing in the floor and positioned by pivoting round a shaft parallel to the direction of forward travel of the said low floor; the rollers and their support arms are retractable to permit the folding back of the pivoting quarters above the low floor.

Still according to the invention, the central floor is extended lengthwise by raised platforms ending in a point at each end of the chassis; these platforms are situated at a level below the level of the high floor which overlaps them partially and they comprise, on the pivoting quarters' side, a pivoting section which is articulated around a vertical shaft situated substantially at the point of the platform; this pivoting section forms a floor level which is intermediate between the quarter and the platform; furthermore, in a deployed position, the outer ridge of the pivoting section is situated in the extension of the ridge of the platform, on the high floor side.

The theater stage according to the invention may also comprise an expandable roofing structure. In this case, the theater stage takes the form of a shell divided into three bodies: a central body on the basic chassis consisting of the central floor, of vertical walls and of a roof, a sliding rear body in the form of a box built on the high floor, a front body consisting of the low floor, the pivoting quarters and a canopy capable of being folded back, also serving, in a closed position, as a wall for the central body. The expandable roofing structure consists of a central truss resting on two posts situated at the points of the outermost platforms, and of two side trusses situated in a vertical plane passing through the edge of the central floor; one of the side trusses supporting a lifting canopy, the other truss being responsible for supporting a box made up of the high floor and the shuttering of the of the central roof assembly.

According to a preferred embodiment of the invention, panels provide the connection between the roofing structure and the chassis; a fixed panel is arranged along a ridge of each platform, and a panel articulated to the central post and integrally fastened to the ridge of the pivoting section covers the other ridge of the said platform.

According to another embodiment of the invention, the vertical panels integrally fastened to the pivoting sections support, on the one hand, the connecting roofs which extend as far as the canopy in a deployed position and, on the other hand, supplementary closure panels which extend as far as the canopy where it is in its foldback position forming a vertical wall, along the edge of the central floor. The supplementary panels are polygonal in shape, one is fixed and integrally fastened to a scaffolding which is mobile with the pivoting section, the other is articulated to the canopy in order to be folded back toward the interior of the shell when the whole assembly is folded.

Another purpose of the invention is to produce a vehicle whose theater stage is set out very quickly and effortlessly, with the participation of a single operator.

According to the invention, the mobile elements are deployed, on the one hand, by pivoting around vertical shafts in the case of the quarters and the pivoting sections and of a horizontal shaft in the case of the canopy, the movement of the latter being ensured by at least one jack and, on the other hand, by translation in the case of the low floor and the high floor forming a box, the latter being guided by appropriate means arranged on each side of the central floor.

The invention also relates to the basic chassis intended to receive the elements forming the various floor levels and the shell roof. This chassis comprises particularly, in its lower part, for guiding the low floor, rails which extend over its entire width and each of which is integrally fastened to a cradle which also supports, by means of journals, the shafts of the pivoting quarters. In its upper part, the chassis also comprises, above the abovementioned cradles, tracks extending also over its entire width, which are intended for guiding sliding members integrally fastened to the rear box.

The invention also relates to a theater stage obtained by grouping together several basic stages around a riser designed to connect two, three or four basic modules, for example.

The invention will be better understood with the aid of the following description and the attached drawings, which are given by way of indication, and in which:

FIG. 4 is a detail view on a larger scale, according to 4—4, showing the guidance of the low floor on the pivoting quarters;

FIG. 7 is a side view of the bare chassis.

Figure 1:
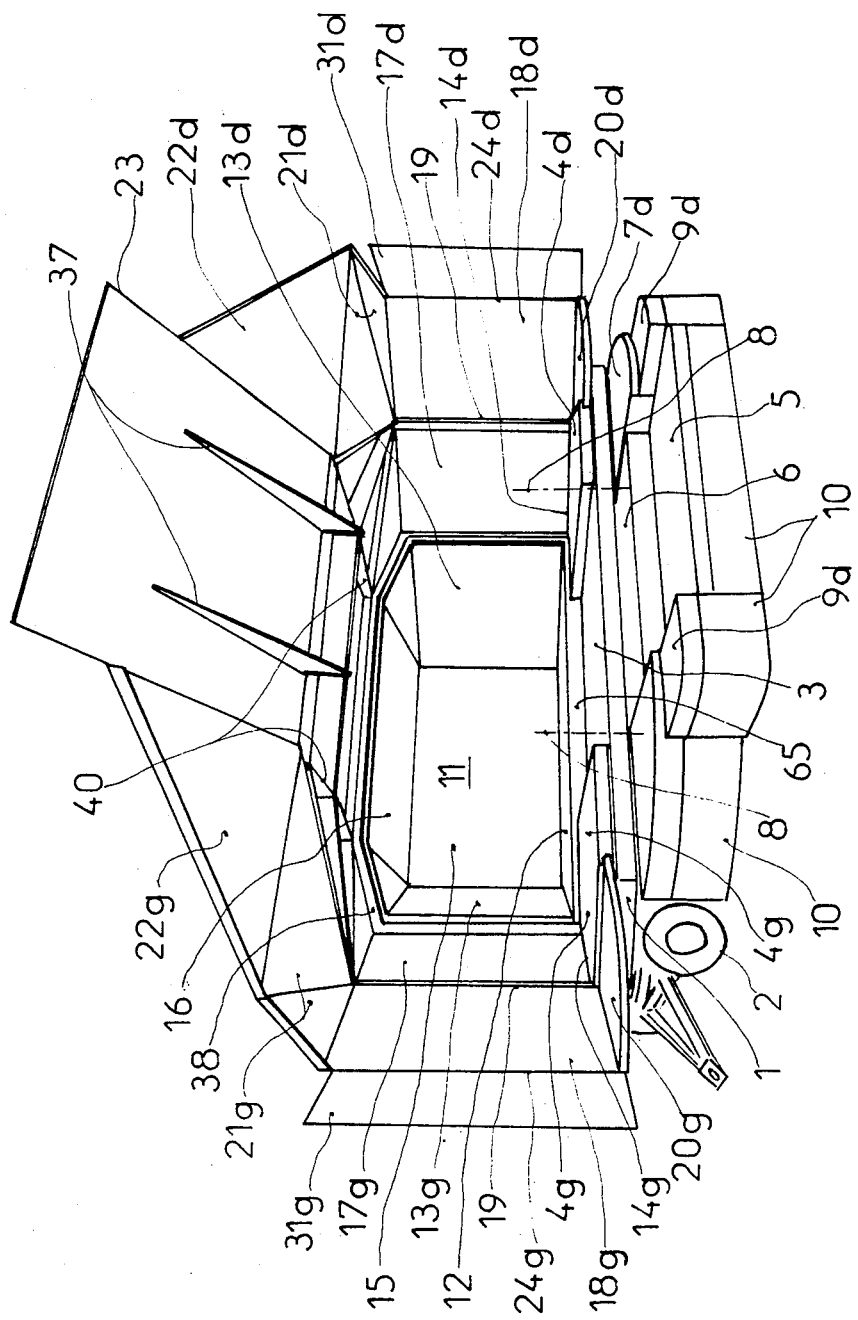
FIG. 1 is a general view of a traveling shell according to the invention, in perspective.

The theater stage shown in FIG. 1 is in a completely deployed position in a possible configuration of the traveling shell capable of receiving an orchestra or a group of musicians. The shell shown in FIG. 1 introduces the particular feature of offering a multitude of offset levels in the form of steps, the whole surrounded by side walls and a roof so as to form a pavilion shape which thus offers good concentration and projection of the music.

The shell principally consists of a chassis 1 capable of forming a trailer and consequently of being equipped with wheels 2 arranged at the front and the rear of the said chassis. The upper central part of the chassis 1 supports a square or rectangular central floor 3; on each side of the chassis 1, this central floor 3 is extended by raised platforms 4d, 4g, which end in a point, or in a V, at each end of the chassis 1.

The shell is symmetrical in relation to the median vertical plane which cuts the basic chassis 1 transversely; as a result of this, the references will be identical for the elements situated to the right (d) or to the left (g) of an observer placed in front of the shell; in FIG. 1, the left-hand part, such as defined, also corresponds to the front of the chassis 1 forming the trailer, while the right-hand part corresponds to the rear of the said trailer.

A low floor 5 extends in front of the shell, together with an intermediate floor 6 placed on the structure of the said low floor; the latter is guided in translation under the chassis 1 and between the two pivoting elements 7d, 7g, which are arranged between the said chassis 1 and the said low floor 5. The above guidance means will be described in detail later.

The pivoting elements 7 are in the shape of a quarter of a circle or of an ellipse, optionally with straight portions; these pivoting elements 7, or quarters 7, articulate around vertical axes 8d, 8g arranged substantially at each angle of the central floor 3, on the side of the low floor 5. When the low floor 5 is in a completely retracted position under the chassis 1, the quarters 7 pivot through 180° and are positioned in the space available between the said chassis 1 and the said retracted low floor 5; in addition, in a closed position, these pivoting quarters 7 form a smooth wall on the flank of the chassis 1.

The pivoting quarters 7 are shown in FIG. 1, with projections 9 forming supplementary low levels between the level of the said pivoting quarters 7 and the low floor 5. These projections 9 have the shape of a drawer sliding in the quarters 7; in a pulled-out position, they extend as far as the end of the low floor 5; in a shut position, they are inscribed completely within the quarters 7. FIG. 1 also shows a supplementary skirt 10 which covers the entire facade of the shell after the various elements have been deployed. This skirt 10 is made of a supple material which can be stapled or inserted section by section into suitable slides.

The rear part of the shell, beyond the central floor 3, is in the form of a box 11 built on a high floor 12, which is situated at a level below the level of the platforms 4. This high floor 12 slides over the central floor 3 and over the platforms 4, in part. The means for guiding this high floor, and consequently the box, in a general manner, will be described later.

The box 11 comprises vertical side walls 13d and 13g arranged substantially in the extension of the ridges 14d and 14g of the platforms 4 when the box is in a completely pulled-out position. It also comprises a vertical wall forming the back 15 of the shell and a roof 16 consisting of elements arranged in the extension of the central roof of the shell, that is to say the roof covering the chassis 1; the latter will be described in detail later in conjunction with FIG. 3. The side walls of the box 11 are also extended over the chassis 1 by fixed vertical walls 17d and 17g and pivoting vertical walls 18d and 18g, articulated around shafts 19 arranged substantially at the point of the platforms 4. These pivoting walls 18d and 18g are integrally fastened to pivoting sections 20d and 20g, which are articulated around the same vertical shaft 19; these pivoting sections 20 are inserted into the thickness of the platforms 4 and form a floor level which is intermediate between the level of the platforms 4 and that of the pivoting quarters 7.

The pivoting side walls 18 support quadrilaterally shaped roof elements 21d and 21g, associated with triangular roofing elements 22d and 22g which extend as far as the canopy 23, described later, FIG. 3.

The triangular elements 22 provide the connection between the elements 21 and the canopy 23; they are articulated to the edge of the canopy and fold back with the latter.

Figure 2:
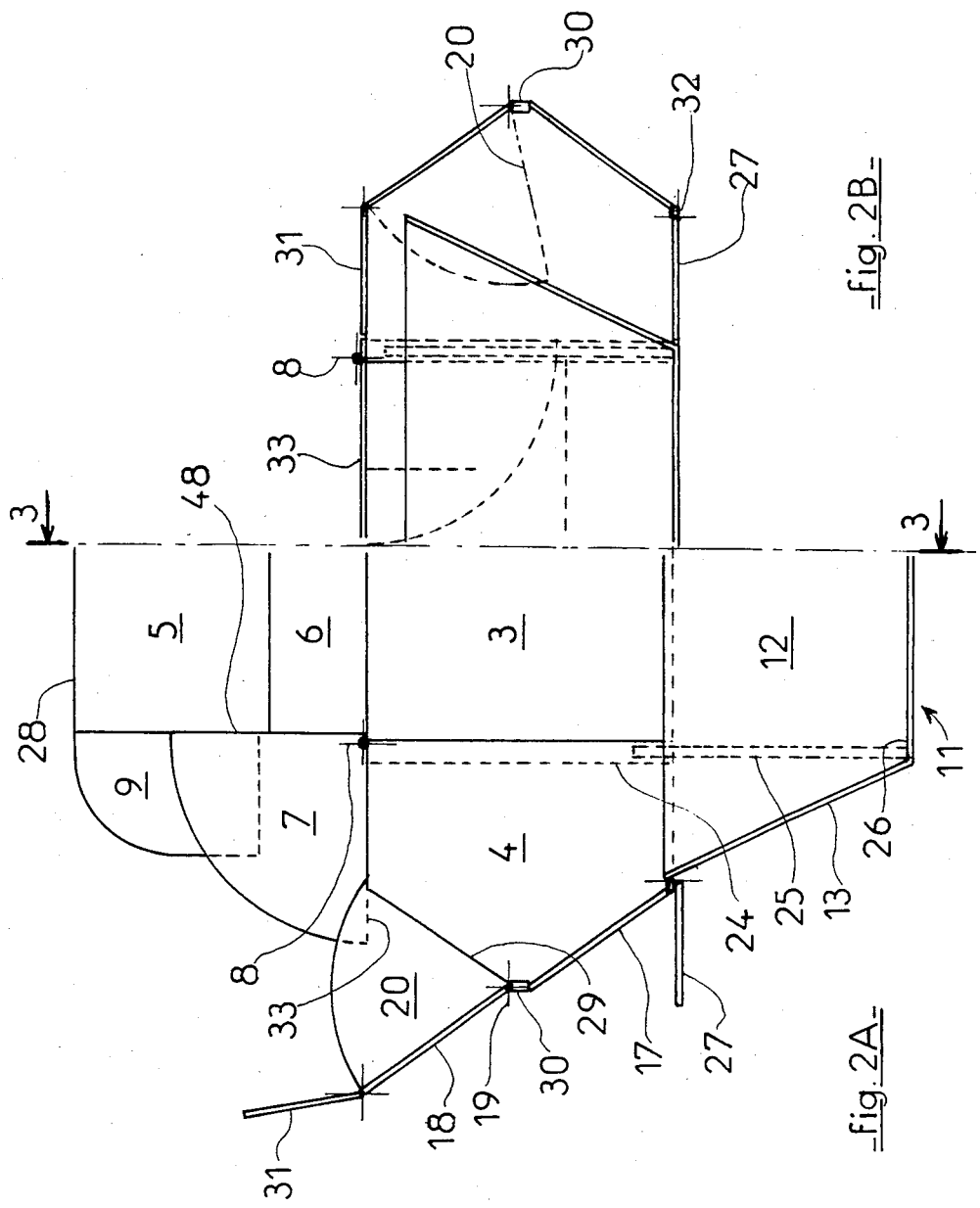
FIG. 2 is a top view of the shell without the cover, according to two configurations:
A: the stage is deployed,
B: the assembly is in a closed position for transport.

Supplementary panels 31d and 31g, whose purpose will be explained in FIG. 2, are articulated to the vertical edges 24 of the pivoting panels 18, respectively.

FIG. 2A shows a half of all the shell floors, in a completely deployed position, viewed from above. It thus again shows the rectangular central floor 3 extended by the platform 4, which terminates in a point. The assembly consisting of the central floor 3 and the two platforms 4 rests directly on the chassis 1 and forms the minimum surface area of the shell. This surface can be increased on one side by completely or partially pulling out the high floor 12 from the box 11, as required; the box is shown pulled out completely in FIG. 2A. This floor 12 is guided by means of the track 24 arranged transversely on each side of the central floor 3, under each platform 4, and of the sliding member 25 integrally fastened to the floor 12 at its rear end 26; these guidance means will be described in detail later, FIGS. 5 and 6.

FIG. 2A also shows a panel 27 in an open position; this panel is intended to shut off the space remaining between the box 11 and the end of the vertical wall 17, when the box is in a retracted position.

The basic surface area of the shell is also increased by means of the low floor 5 which slides under the chassis 1, and more particularly under the central floor 3. This low floor 5 may consist of two levels by virtue of the intermediate floor 6, thus forming a series of steps.

At the side of the low floor there can be seen the pivoting quarter 7 serving both to support the said low floor by means which will be described in detail in FIG. 4, and as a floor situated at a level equivalent, for example, to that of the intermediate floor 6, that is to say between the level of the central floor 3 and the level of the low floor 5. Each pivoting quarter 7 also comprises a projection 9 which can be deployed by sliding in the said quarter and it extends as far as the end 28 of the low floor 5. These projections 9 accompany sideways the low floor 5 and form a floor level intermediate between the pivoting quarters 7 and the said low floor.

FIG. 2A also shows the pivoting section 20 which extends, on a slightly lower level, each platform 4, on the side of the low floor 5. Each section 20 is bounded by the ridge 29 of the platform 4, on the one hand, and the pivoting vertical wall 18.

The vertical walls 18 pivot around an axis 19 and they are integrally fastened to the posts 30 situated at the point of the platforms 4. When it is in a deployed position, the wall 18 is situated substantially in the extension of the fixed wall 17, which corresponds to the ridge 14 of the platform 4 and in the extension of the wall 13 of the box 11.

The wall 18 further comprises a supplementary shutter panel 31 the purpose of which is to close the space between the canopy 23 and the said wall 18 when the assembly is folded back.

FIG. 2B shows a half of the shell in its folded form, in its minimum bulk during its storage or for transport. This minimum bulk corresponds to the bulk of the chassis 1. The box 11 slides on the central floor 3 and on the platforms 4, partially overlapping the total surface area of the chassis 1; in this position, the panel 27 shuts off the space remaining between the bottom 15 of the box 11 and the end of the panel 17, and more particularly the side post 32, which supports a truss which will be discussed later; the panel 27 is, in particular, articulated to this post 32.

This FIG. 2B shows the pivoting section 20 in its retracted position in the thickness of the platform 4. The vertical wall 18 which is integrally fastened to the section 20 closely follows the outline of the said platform 4 and the supplementary panel 31 is also positioned against the edge of the platform 4; and it extends as far as the canopy 23 which is closed back into a position of a vertical side wall. The pivoting quarter 7 can pivot through 180° to adopt its position which is shown in FIG. 2B only after the low floor 5 has been pulled back and retracted completely by sliding under the chassis 1. The quarter 7 pivots around the vertical shaft 8 situated close to the corner of the central floor 3. The vertical side 33 of the quarter 7 forms the side wall of the low and central part of the chassis 1. It can also be seen that the sides 33 of the pivoting quarters 7 have, in fact, a length which is substantially equal to one-half of the width of the low floor 3; the other side of the pivoting quarters, that is to say the face 48, has a length which depends either on the width of the chassis 1 if the floor 6 is only a riser arranged on the low floor 5, or on the space which remains in front of this floor 6, on the low floor 5; the shape of the quarter depends on these two possibilities.

It should be noted that the floor 6 may be situated at a level which is appreciably higher than that of the pivoting quarters 7 to enable the latter to be housed, in a folded position, in the free space between the low floor 5 and the front part of the intermediate floor 6.

It can also be seen in FIGS. 2A and 2B that the basic surface area of the chassis is almost tripled in relation to the total basic surface area of the chassis 1, when all the elements are deployed.

Figure 3:
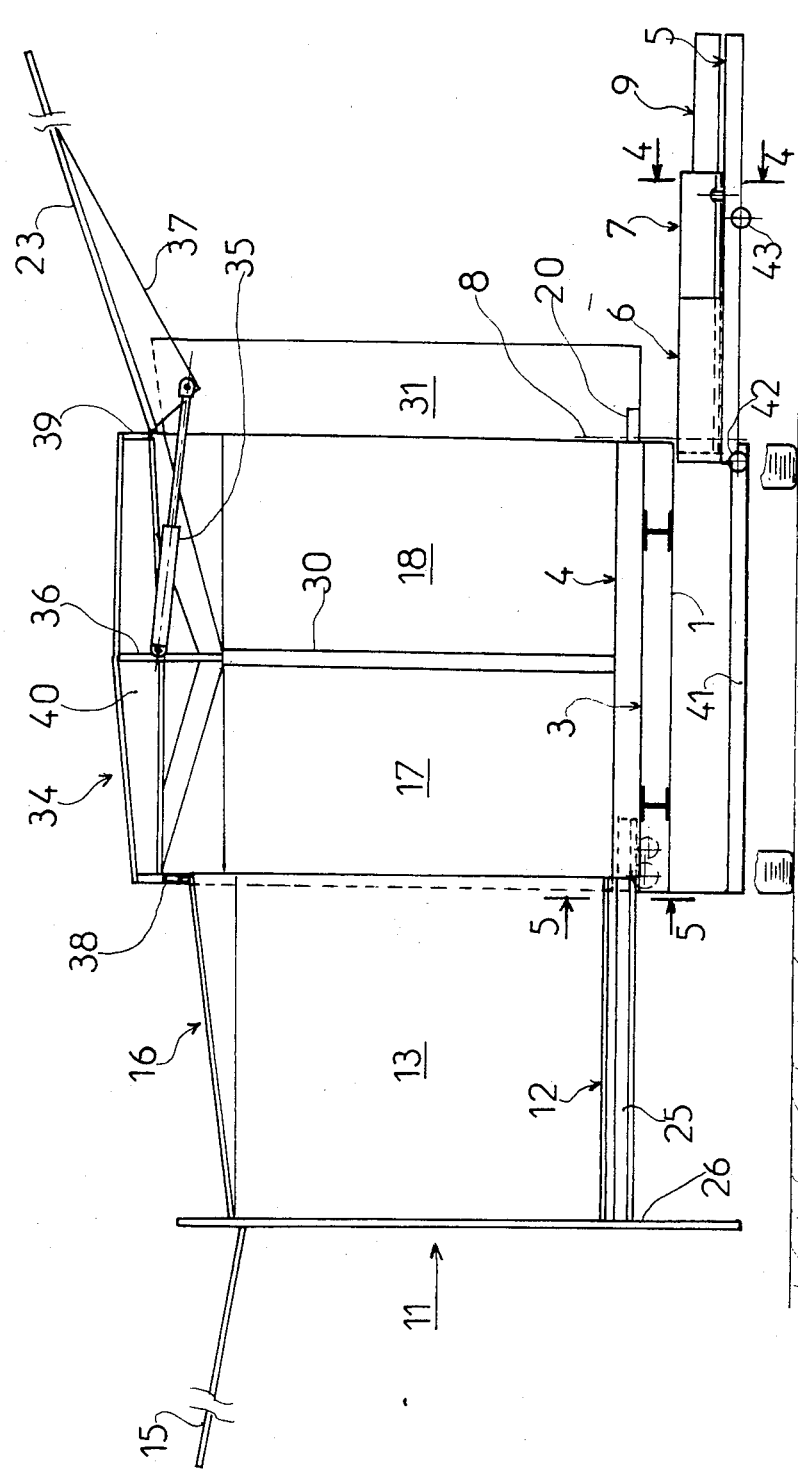
FIG. 3 is a side view along the section plane 3—3.

FIG. 3 shows the deployed shell in cross-section. Three bodies can be clearly distinguished: the central body on the chassis 1, the rear box 11 and the front part under the canopy 23. Starting at the back of the box 11, the cross-sections of the shell increase, to produce a shape which is close to that of a pavilion, as already said. Also to be seen are the various floor levels from the high floor 12 of the box 11 to the low floor 5, via the central floor 3, surmounted by the platform 4, the intermediate floor 6 integrally fastened to the low floor 5, the pivoting quarter floor 7, the projections floor 9 which comes out of the quarter 7, and the portion of the pivoting sector floor 20 which appears at the end of the platform 4.

In the same manner, the roof of the shell rises from the roof 16 of the box, then the central roof 34 and the canopy 23 whose slope results from the action of at least one jack 35 inserted between the central truss 36 and the ribs 37 under the awning. The central roof rests on three trusses flats: the central truss 36 integrally fastened to the posts 30, the rear side truss 38 integrally fastened to the posts 32 and the front side truss 39 supported by crossbars 40 fastened to the above two trusses 36 and 38.

It can also be seen in this FIG. 3 that the back 15 of the box 11 pivots and can also form a canopy. In the same manner, the remaining two side walls 13 of the box 11 can be raised and thus offer a view of the stage from different angles.

In this deployed position, the ends of the box 11 and of the low floor 5 may comprise props, which are not shown, for stabilization of the levels in order to provide greater rigidity.

Also visible in FIG. 3 is a rail 41 for the purpose of guiding the low floor 5 under the chassis 1.

FIG. 4 shows details of the guidance system of the low floor 5, when it comes out of its housing, under the chassis 1 and more especially under the central floor 3.

Under the chassis, the floor 5 is stowed like a drawer, FIG. 3; it rests on side rails 41 which are integrally fastened to the chassis, via rollers 42 and 43 arranged, respectively, at the rear end of the said drawer and midway in the half toward the front, so as to support it until the time when the guidance system, on the pivoting quarters 7, takes over. This guidance system, arranged on each side of the floor 5, consists of a roller 44 carried by an arm 45 which pivots around a shaft 46 parallel to the direction of travel of the said floor 5. The roller 44 travels in an open open rail 47 at the side of the floor 5, integrally fastened to the side 48 of the pivoting quarter 7; this side 48 being parallel to the direction of travel of the low floor 5. The low part of the rail 47 is situated on the same level as the lower plane 49 of the pivoting quarter 7, to enable the said quarter to pivot above the floor 5. The roller 44 can retract by pivotting around the shaft 46 and, in an inactive position, is placed in a housing 50 arranged in the low floor 5, also to permit the pivoting of the quarter 7 which is normally placed, when folded back, between the chassis 1 and the low floor 5.

The arm 45 can also move on the shaft 46, and this enables it to be locked in a vertical position in an appropriate housing 51 in the floor 5. The placing of the rollers 44 in the corresponding rails 47, or their withdrawal, is done manually or by any other suitable means when the low floor 5 comes out or when it is placed back under the chassis 1. Similarly, to avoid any asperity, caps, which are not shown, may be placed over the housings 50 when the rollers 44 are in an active guidance position. Furthermore, the rail may be inscribed in the thickness of the quarter 7 behind its face 48, and in this case the roller 44 may also take the form of an "hourglass" interacting with an appropriate rail.

Figure 5:
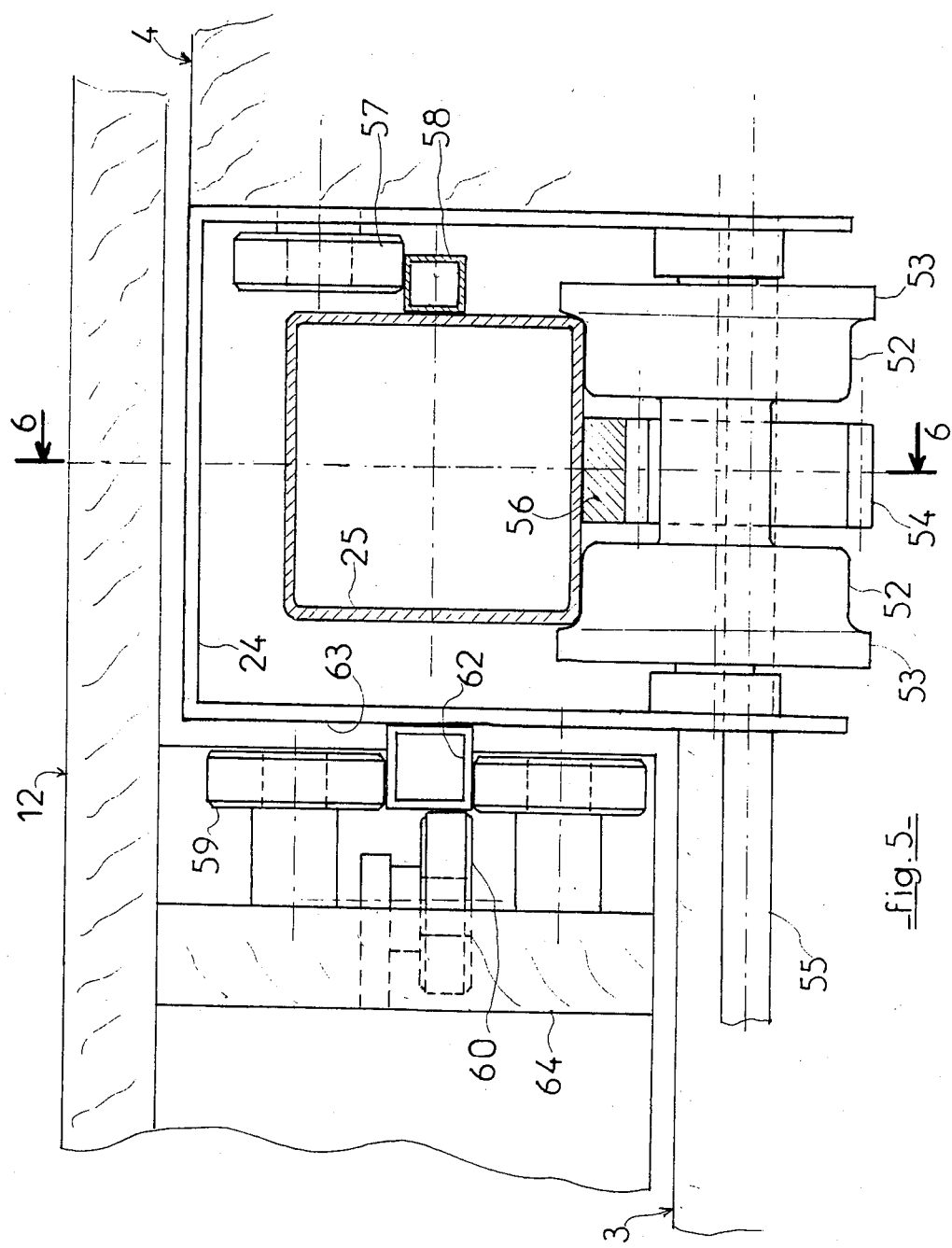
FIG. 5 is a detail view in enlarged cross-section along 5—5, showing the box floor guidance system.

FIG. 5 shows, in an enlarged section along 5—5 of FIG. 3, the system for guiding the box 11, situated in the region of the floor 12. As has been shown in FIG. 2, the floor 12 is guided by means of tracks 24 arranged on each side of the central floor 3 and of the platform 4. This track 24, subtantially square in cross-section, contains a sliding member 25 which is integrally fastened to the end 26 of the box 11, under the floor 12, FIG. 3. This sliding member 25 rests on rollers 52 arranged in the low part, at the entry of the track 24. These rollers 52 are responsible for guiding and centering the sliding member between their side flanks 53. The movement of the two sliding members 25, situated on each side of the central floor 3, is synchronized by means of a rack-and-pinion device; the two pinions 54 being integrally fastened together by means of a shaft 55 which extends under the central floor 3. The racks 56 are arranged under the sliding members 25 and pass between the two rollers 52. In order to maintain the pinion 54 and the rack 56 in permanent contact, a roller 57, situated in the region of the said pinion 54, travels on a rail 58 fixed to the side of the sliding member 25. The roller 57 is mounted on a horizontal shaft at right-angles to the direction of travel of the sliding member, inside the track 24.

Also shown in FIG. 5 are the guidance elements consisting of the rollers 59, 60 and 61 which travel on the three faces of a rail 62 attached to the outer side face 63 of the track 24. These rollers are integrally fastened to the structure 64, under the floor 12, and they are situated at the front end of the said floor, behind its vertical wall 65 which can be seen particularly in FIG. 1. These guidance members are intended to prevent a gap being formed between the floor 12 and the central floor 3 and the platforms 4, especially when the chassis of the trailer is slightly askew.

Figure 6:
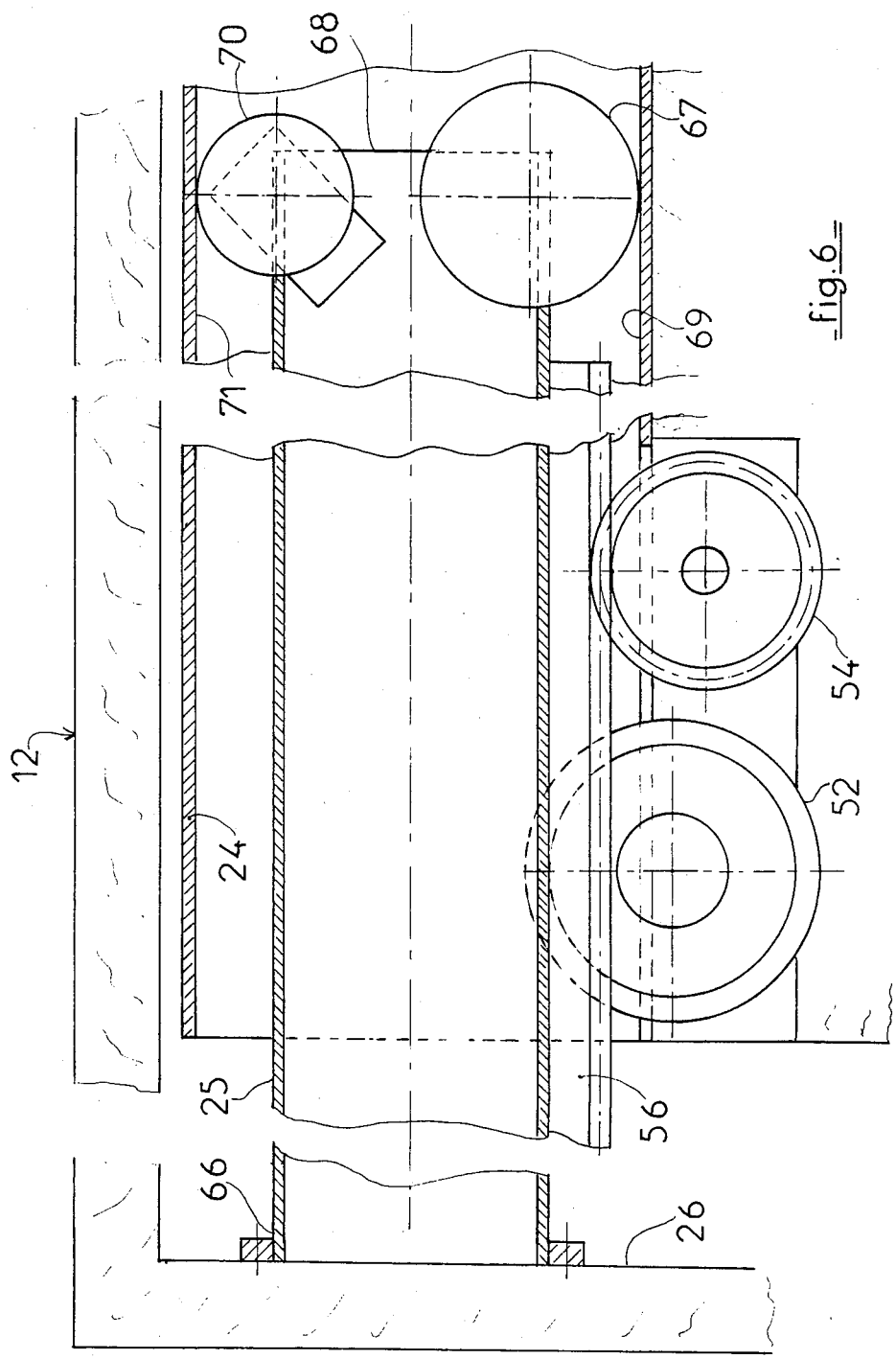
FIG. 6 is cross-section along 6—6 of the guidance system of FIG. 5.

FIG. 6 shows a cross-section along 6—6 of the guidance system shown in FIG. 5. Inside the track 24, the sliding member 25 is again seen, its end 66 being integrally fastened to the end 26 of the drawer 11. This sliding member 25 rests on rollers 52 which are integrally fastened to the track 24 at its entry, and it comprises at least one roller 67, at its other end 68, which travels inside the track 24, on its inner horizontal face 69. Another roller 70 is arranged in the upper part of the end 68 of the sliding member 25, 25; this roller 70 travels on the inner horizontal face 71 of the track 24, and it prevents the box 11 from tilting when it comes out.

The pinion 54 is situated beside the rollers 52, toward the inside, and it can receive a suitable maneuvering device enabling the box 11 to be placed in position effortlessly.

FIG. 7 shows the chassis 1, under the various floors. This chassis 1 consists, in a tradtional manner, of at least two lengthwise members 72 and of uniformly distributed crossbars 73. To guide the low floor 5, in its lower part it comprises rails 41 which extend over the entire width of the chassis; each of these rails 41 being integrally fastened to a cradle 74 on which there are also to be found journals 75, 76, which support the articulation shaft 8 of the pivoting quarters 7. These shafts 8 are arranged at the edge, outside the chassis 1.

At the same level as these shafts 8 there are to be found, above the chassis 1, the tracks 24 which serve to guide the sliding members 25 of the box 11 and more particularly of its floor 12.

At the ends of the chassis 1, there are also to be found the posts 30 which support the central rigid truss of the roof. Under the chassis 1 are also to be found members 77 for anchoring and for locking the pivoting quarters 7 when they are in a deployed position.

The shell as described above can also be adapted, by means of one or more additional members, for various spectacles. The central floor 3 and the platforms 4, for example, may receive one or more removable risers which provide, together with the box 11, a completely flat stage. Provision can also be made for installing wings and dressing rooms at the ends of the chassis.

In the same manner, the box may be provided with a floor which slides rearwards in order to create an additional extension in depth.

Particular locations may also be provided for storing accessories such as spare wheels, special equipment such as an electric switchboard and a hydraulic control board for maneuvering the canopy 23, in particular.

A structure of this kind can also be adapted to a base other than of the highway type and particularly on a railroad or seaway base.

The stage may also be doubled, tripled or quadrupled by setting up a group of several chassis 1 around appropriate risers.

What is claimed is:

1. A theater stage consisting of an elongate base chassis (1) resting on legs or props and preferably on wheels, of the type equipped with at least one side extension which is in the form of at least one mobile floor capable, furthermore, of forming a level which is offset in relation to the central floor arranged on the chassis, which stage comprises side extensions on each side of the central floor, which consist, on the one hand, at the rear of the said central floor and forming an upper level, of a high floor sliding over the central floor and, on the other hand, on the front part of the said central floor and forming the lower levels, of a low floor sliding under the central floor and comprising one or more levels.

2. The theater stage as claimed in claim 1, which comprises side floors on each side of the low floor, these floors being in the form of a quarter of a circle, or of an ellipse, pivoting around vertical shafts arranged close to the corners of the central floor (3), and being arranged, in a folded position, between the chassis and the low floor.

3. The theater stage as claimed in claim 2, wherein the pivoting quarters comprise, in a deployed position, guidance means interacting with retractable members arranged on the low floor.

4. The theater stage as claimed in claim 3, wherein the means for guiding the low floor on each pivoting quarter consist of a guidance rail arranged on the face of the said pivoting quarter, this rail interacting with a roller integrally fastened to an arm capable of retracting with the roller into a housing in the said low floor, by pivoting around a shaft parallel to the direction of travel of the said low floor.

5. The theater stage as claimed in claim 1, wherein the central floor is extended lengthwise by means of raised platforms ending in a point at each end of the chassis, these platforms being situated at a level lower than the level of the high floor which partly overlaps them.

6. The theater stage as claimed in claim 5, wherein the platforms comprise, in their thickness, on the side of pivoting side floors in the form of a quarter of a circle or ellipse, a section forming a floor, and pivoting around a vertical shaft situated substantially at the point of the said platforms, in a deployed position, the outer ridge of these sections being situated in the extension of the ridges of the corresponding platforms.

7. The theater stage as claimed in claim 1, wherein the high floor is guided in translation by means of tracks arranged on each side of the central floor, against the platforms and of sliding members integrally fastened to the end of the said high floor, the sliding members of the box travel on rollers situated at the entry of each track and each comprises a rack interacting with a pinion; the two pinions being integrally joined together by means of a common shaft arranged under the central floor.

8. The theater stage as claimed in claim 1, which is composed of three main bodies taking, in a deployed position, the shape of a pavilion or of a shell: a central body consisting of the central floor, platforms, side walls and of a roof supported by a central truss integrally fastened to the vertical outermost posts, and by two side trusses, a rear body in the shape of a box built on the high floor comprising side walls, a back and a roof, and a front body consisting of the various front floors, the low floor, pivoting side floors in the form of a quarter of a circle or ellipse, and consisting of a canopy articulated to the front truss and serving as a vertical wall in a folded position, this canopy being actuated by at least one jack.

9. The theater stage as claimed in claim 8, wherein the side vertical walls are integrally fastened to the chassis and support the scaffolding consisting of the central and side trusses and wherein the side walls pivot with the sections around vertical shafts integrally fixed to the outermost posts of the chassis; these side walls supporting roof members in the form of quadrilaterals which are joined to the canopy by means of triangular roof members articulated to the said canopy.

10. The theater stage as claimed in claim 2, wherein the pivoting quarters comprises retractable projections in the form of a drawer sliding in the thickness of the said quarters.

11. A chassis for the theater stage as claimed in claim 1, of the type comprising lengthwise members extending over the entire length of the stage and uniformly distributed crossbars, which chassis comprises, in its lower part, for guiding the low floor, rails extending over the entire length of the chassis and each of which is integrally fastened to a cradle on which are fixed journals intended to support shafts of pivoting side floors in the form of a quarter of a circle or ellipse.

12. The chassis for a theater stage as claimed in claim 11, which comprises, in its upper part, above the cradles, tracks of square cross-section, extending over the entire width of the chassis, and intended for guiding the sliding members integrally fastened to the high floor.

13. A theater stage which is composed of a group of several chassis as claimed in claim 12, around an appropriate riser.

* * * * *